No. 805,504. PATENTED NOV. 28, 1905.
W. E. TRUFANT.
FRICTION DRIVE SPEED GEAR.
APPLICATION FILED APR. 25, 1904.

2 SHEETS—SHEET 1.

WITNESSES.
INVENTOR.
W. E. Trufant.

No. 805,504. PATENTED NOV. 28, 1905.
W. E. TRUFANT.
FRICTION DRIVE SPEED GEAR.
APPLICATION FILED APR. 25, 1904.

2 SHEETS—SHEET 2.

WITNESSES. INVENTOR.
Geo D Soule W. E. Trufant.
G. Howard Soule

UNITED STATES PATENT OFFICE.

WALTER E. TRUFANT, OF WHITMAN, MASSACHUSETTS.

FRICTION-DRIVE SPEED-GEAR.

No. 805,504.

Specification of Letters Patent.

Patented Nov. 28, 1905.

Application filed April 25, 1904. Serial No. 204,682.

*To all whom it may concern:*

Be it known that I, WALTER E. TRUFANT, of Whitman, in the county of Plymouth and State of Massachusetts, have invented certain new and useful Improvements in Friction-Drive Speed-Gear, of which the following is a specification.

My invention relates to speed-changing gearing adapted to automobiles and motor-trucks; and it consists in a disk receiving power from a suitable engine and transmitting it through rolls to the driving-shaft and means for moving the rolls along the face of the disk to obtain the slower speeds and reverse and arranged to disconnect the disk from the power-shaft and couple the power-shaft and the driving-shaft together to make drive direct for high speed.

Figure 1:
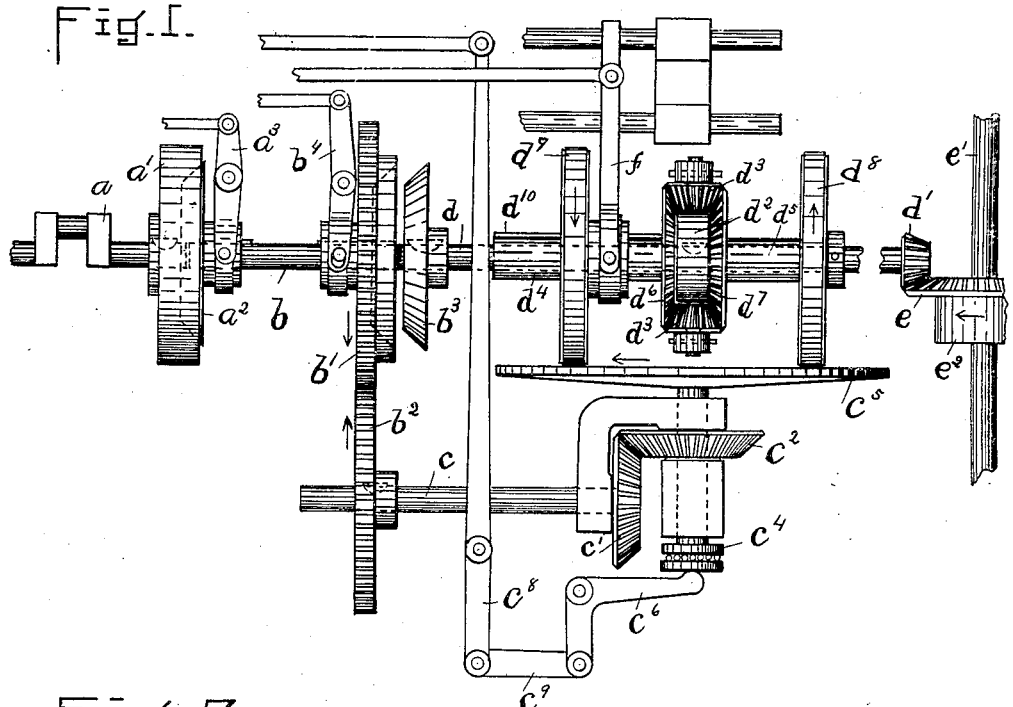
Figure 2:
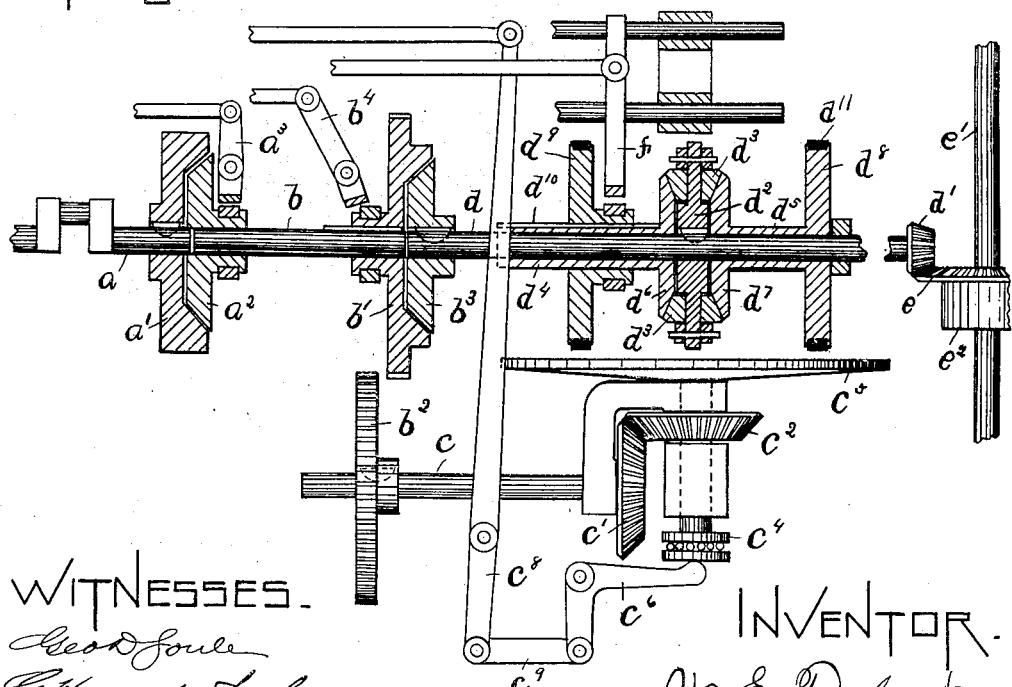
Figure 3:
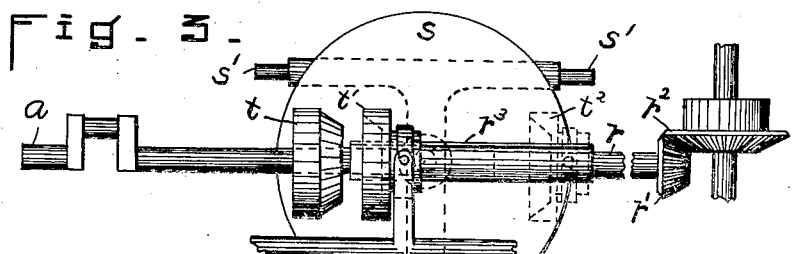
Figure 4:
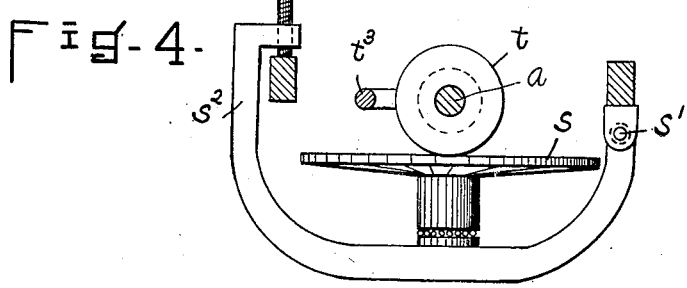
Figure 5:
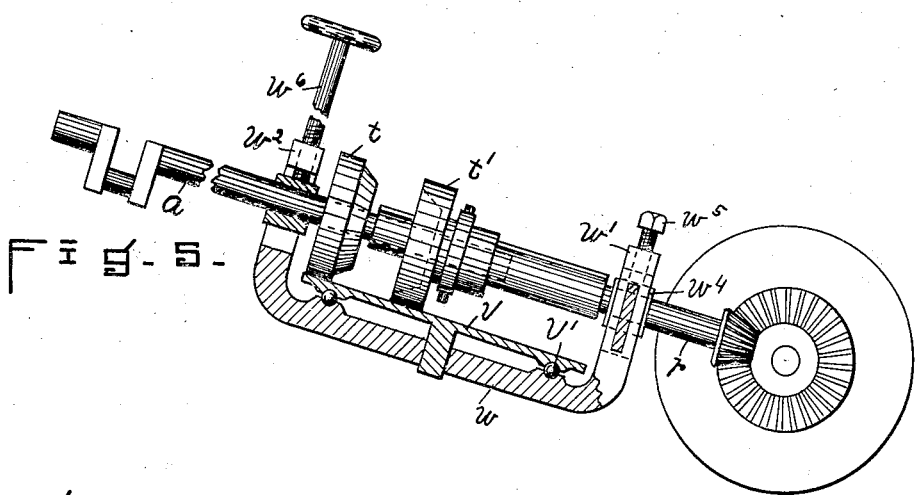

In the accompanying drawings, forming a part of this specification, Figure 1 is a view of one embodiment of my invention, showing the different parts and means for changing the speed. Fig. 2 is a view of the same largely in section and showing some of the parts in a different position, and Fig. 3 is a plain friction-drive with means for throwing out the disk and coupling the engine-shaft and the driving-shaft directly together. Fig. 4 is another view of the device shown in Fig. 3, and Fig. 5 is a modification of the same.

In Figs. 1 and 2, $a$ represents the engine or driving shaft, to which is keyed the balance-wheel $a'$, which also forms the female part of the cone-clutch $a^2$, which is keyed to slide on a feather on the shaft $b$ and is operated by the lever $a^3$. The shaft $b$ carries at the other end the gear $b'$, keyed to slide on the shaft and mesh with the gear $b^2$ on the shaft $c$. This gear $b'$ is slid on the shaft by the lever $b^4$ and forms the female part of the clutch $b^3$. The shaft $c$ carries the gear-wheel $c'$, which meshes with gear $c^2$ on the stem $c^4$ of the friction-disk $c^5$. The clutch member $b^3$ is keyed to the shaft $d$, which terminates with the gear $d'$, meshing with gear $e$ on the live rear axle $e'$, which may be provided with the usual differential $e^2$. On the shaft $d$ is keyed the hub $d^2$, which carries the small bevel-gears $d^3\ d^3$, and mounted on the sleeves $d^4$ and $d^5$ to revolve freely on the shaft in mesh with these gears are the gears $d^6\ d^7$. Fixed to the sleeve $d^5$ is the friction-roll $d^8$, and on the sleeve $d^4$ is the friction-roll $d^9$, which is made to slide axially on the feather $d^{10}$ on the sleeve. The disk $c^5$ is raised and lowered and the pressure on the rolls to give sufficient friction is secured by the lever $c^6$, which acts on the thrust-bearing $d^4$, which supports the disk. The lever $c^6$ is conveniently operated through the link $c^9$ and lever $c^8$.

In Fig. 1 power is applied by means of a suitable engine to the shaft $a$ and is transmitted through the clutch $a'\ a^2$ to the shaft $b$ and through this shaft and the gears $b'\ b^2$, shaft $c$, gears $c'$ and $c^2$ to the friction-disk $c^5$, and as this disk rotates in the direction shown by the arrow the roll $d^8$, with the sleeve $d^5$ and gear $d^7$, is made to rotate in one direction, and the roll $d^9$ and the sleeve $d^4$ and gear $d^6$ in the opposite direction. The bevel-gears $d^6\ d^7\ d^3\ d^3$ constitute a differential gear, so arranged that the hub $d^2$, which carries the gears $d^3\ d^3$, will not move so long as the rotation of the gears $d^6$ and $d^7$ is equal; but if the roll $d^9$ is moved by the shipper $f$, so that it is farther from the center of the disk than the roll $d^8$, it will revolve faster than roll $d^8$ and will carry with it the hub $d^2$ and shaft $d$ at a speed equal to the speed of the roll $d^9$, less the speed of $d^8$. If the roll $d^9$ is moved to a point nearer the center of the disk than the roll $d^8$, the hub and shaft $d$ will revolve in the same direction as $d^8$ at the speed of $d^8$, less the speed of $d^9$, which is the reverse speed of the vehicle. It will be noticed that by shifting the roll $d^9$ all speeds both forward and reverse within the range of the friction-disk can be obtained with the engine running at normal speed and at all speeds all of the power of the engine be transmitted to the driving-wheels.

After the vehicle has been started and is moving at fair speed forward the friction-plate $c^5$ may be lowered, so as to be free from the rolls, and the gear $b'$, by means of the lever $b^4$, is slid out of engagement with the teeth of the gear $b^2$ and the clutch-surface of $b'$ and $b^3$ brought together, thus making the shafts $b$ and $d$ turn as one at the same speed and leaving all the other parts of the speed-gear at rest, as shown in Fig. 2. When it is desired to secure more power or to reduce the speed of the vehicle, the clutch $a'\ a^2$ is disengaged by the lever $a^3$, then the gear $b'$ is disengaged from the clutch $b^3$ and slid into mesh with gear $b^2$, and the clutch $a'\ a^2$ is then engaged and the friction-disk brought into contact with the friction-rolls and the vehicle controlled as at first described. The face of the friction-rolls may be faced with leather or other suitable material, as shown at $d^{11}$.

A drive of the simplest form of my invention is shown in Figs. 3, 4, and 5, and is especially adapted to light work. The shafts $a$ and $r$ are in line and carry the rolls $t$ and $t'$, respectively, and these rolls each have a friction-surface, which when brought together form a clutch and make the shafts $a$ and $r$ continuous and the drive direct. The shaft $r$ has a feather $r^3$, on which slides the roll $t$ by means of the shipper $t^3$. The disk $s$ is carried by the casting $s^2$, which is supported at three points, consisting of the bearings or hinge-joints $s'$ $s'$, parallel with the shaft $r$, fixed to the frame of the machine, and opposite the bearings by the screw $s^3$, which is threaded to the casting and rests on the frame of the machine, so that by turning the screw by means of the hand-wheel $s^4$ the disk is raised against or lowered away from the rolls $t$ $t'$. When the vehicle is started, the roll $t'$ may be near the center of the disk $s$, and the roll $t$, propelled by the engine, imparts a rotary motion to the disk. This imparts a slow movement to the roll $t'$ and through gears $r'$ $r^2$ to the vehicle. While the roll $t$ is in contact with the disk the latter moves at a uniform speed, and the speed of the vehicle is regulated by the position of the roll $t'$, and to reverse the motion of the vehicle the roll is moved by the center of the disk. When the roll $t'$ is at the point shown by the dotted lines $t^2$, the vehicle will be traveling at full speed backward, and from this point, as the roll is slid along the disk, the speed is gradually reduced until the center of the disk is reached, when the roll will be at a standstill. A further sliding of the roll gives the slowest speed forward, and so on, until the roll comes in contact with the roll $t$, which forms a clutch, so that the shafts $a$ and $r$ turn as one. The disk, by means of the hand-wheel $s^4$, is then lowered, so as to be free of the rolls, and the disk comes to rest, and the only moving part is the shaft. To change the speed of the vehicle, the disk is again brought in contact with the rolls and the speed regulated, as above described. The construction shown in Fig. 5 is similar to that of Figs. 3 and 4; but in this figure the disk $v$ is carried on the balls $v'$ by the yoke $w$, which is suspended on the shafts $a$ and $r$ by the boxes $w^3$ and $w^4$, which are carried in a slot in the yoke. The yoke and disk are raised by the screw $w^5$, threaded to the yoke at $w'$ and resting on the journal $w^4$, and the screw $w^6$ threaded to the front end of the yoke at $w^2$ and resting on the journal-box $w^3$.

In all the figures for the sake of clearness many of the parts have not been shown, and as far as possible those shown have been brought into the same plane, and in any of the figures it is evident that both rolls may be made to slide on the shaft, which would of course give greater variation of speed, and the disk itself may be made to shift in a line parallel to the axis of the rolls, which would have the same effect as shifting both rolls.

There are many other variations and changes which can be made without departing from the scope of my invention.

What I claim as new, and desire to secure by Letters Patent of the United States, is—

1. In an apparatus of the kind described the combination of, a power-shaft, a disk receiving power from said power-shaft, a driving-shaft, an idler-gear carried by said driving-shaft, two rolls mounted on the driving-shaft, means for controlling the frictional contact between the rolls and disk, gears carried by said rolls which mesh with said idler, means for moving one of the rolls along the face of the disk, means for disconnecting the power-shaft from said disk, and means for connecting the power-shaft and the driving-shaft together.

2. In an apparatus of the kind described the combination of, a power-shaft, a disk receiving power from said power-shaft, a driving-shaft, an idler-gear carried by said driving-shaft, two rolls mounted on the driving-shaft, means for controlling the frictional contact between the rolls and disk, gears carried by said rolls which mesh with said idler, means for moving one of the rolls along the face of the disk, and means for disconnecting the power-shaft from said disk.

3. In an apparatus of the kind described the combination of, a power-shaft, a disk receiving power from said power-shaft, a driving-shaft, an idler-gear carried by said driving-shaft, two rolls mounted on the driving-shaft, means for controlling the frictional contact between the rolls and disk, gears carried by said rolls which mesh with said idler, means for moving one of the rolls along the face of the disk, and means for connecting the power-shaft and the driving-shaft together.

4. In an apparatus of the kind described the combination of, a power-shaft, a disk receiving power from said power-shaft, a driving-shaft axially parallel with the face of the disk, an idler-gear carried by said driving-shaft, two rolls mounted on the driving-shaft, means for controlling the frictional contact between the rolls and disk, gears carried by said rolls which mesh with said idler, means for moving one of the rolls along the face of the disk, means for disconnecting the power-shaft from said disk, and means for connecting the power-shaft and the driving-shaft together.

5. In an apparatus of the kind described the combination of, a power-shaft, a disk receiving power from said power-shaft, a driving-shaft axially parallel with the face of the disk, an idler-gear carried by said driving-shaft, two rolls mounted on the driving-shaft, means for controlling the frictional contact between the rolls and disk, gears carried by said rolls which mesh with said idler, means for moving one of the rolls along the face of the disk, and means for disconnecting the power-shaft from said disk.

6. In an apparatus of the kind described the combination of, a power-shaft, a disk receiving power from said power-shaft, a driving-shaft axially parallel with the face of the disk an idler-gear carried by said driving-shaft, two rolls mounted on the driving-shaft, means for controlling the frictional contact between the rolls and disk, gears carried by said rolls which mesh with said idler, means for moving one of the rolls along the face of the disk and means for connecting the power-shaft and the driving-shaft together.

7. In an apparatus of the kind described the combination of, a power-shaft, a disk receiving power from said power-shaft, a driving-shaft, an idler-gear carried by said driving-shaft, two rolls mounted on the driving-shaft, means for controlling the frictional contact between the rolls and disk, gears carried by said rolls which mesh with said idler, means for controlling the rotative distance of said rolls from the axis of said disk, means for disconnecting the power-shaft from said disk, and means for connecting the power-shaft and the driving-shaft together.

8. In an apparatus of the kind described the combination of, a power-shaft, a disk receiving power from said power-shaft, a driving-shaft, an idler-gear carried by said driving-shaft, two rolls mounted on the driving-shaft, means for controlling the frictional contact between the rolls and disk, gears carried by said rolls which mesh with said idler, means for controlling the rotative distance of said rolls from the axis of said disk, and means for connecting the power-shaft and the driving-shaft together.

9. In an apparatus of the kind described the combination of, a power-shaft, a disk receiving power from said power-shaft, a driving-shaft, an idler-gear carried by said driving-shaft, two rolls mounted on the driving-shaft, means for controlling the frictional contact between the rolls and disk, gears carried by said rolls which mesh with said idler, means for controlling the rotative distance of said rolls from the axis of said disk and means for disconnecting the power-shaft from said disk.

10. In an apparatus of the kind described the combination of, a power-shaft, a disk receiving power from said power-shaft, a driving-shaft, an idler-gear carried by said driving-shaft, two rolls mounted on the driving-shaft in frictional contact with said disk, gears carried by said rolls which mesh with said idler, means for moving one of the rolls along the face of the disk, and means for connecting the power-shaft and the driving-shaft together.

11. In an apparatus of the kind described the combination of, a power-shaft, a disk receiving power from said power-shaft, a driving-shaft axially parallel with the face of the disk, a roll mounted in frictional contact with the face of said disk, means for moving the roll along the face of the disk, means for transmitting the power from said roll to said driving-shaft, means for disconnecting the power-shaft from the disk, and means for coupling the power-shaft and the driving-shaft together.

12. In an apparatus of the kind described the combination of, a power-shaft, a disk receiving power from said power-shaft, a driving-shaft axially parallel with the face of the disk, a roll mounted in frictional contact with the face of said disk, means for moving the roll along the face of the disk, means for transmitting the power from said roll to said driving-shaft, and means for coupling the power-shaft and the driving-shaft together.

13. In an apparatus of the kind described the combination of, a power-shaft, a disk receiving power from said power-shaft, a driving-shaft, a roll mounted in frictional contact with the face of the disk, means for moving the roll along the face of the disk, means for transmitting the power from said roll to said driving-shaft, and means for disconnecting the power-shaft from the disk.

14. In an apparatus of the kind described the combination of, a power-shaft, a disk receiving power from said power-shaft, a driving-shaft, a roll mounted in frictional contact with the face of the disk, means for moving the roll along the face of the disk, means for transmitting the power from said roll to said driving-shaft, and means for coupling the power-shaft and the driving-shaft together.

15. In an apparatus of the kind described the combination of, a power-shaft, a disk receiving power from said power-shaft, a driving-shaft, a roll mounted in frictional contact with the face of the disk, means for moving the roll along the face of the disk, means for transmitting the power from said roll to said driving-shaft, means for disconnecting the power-shaft from the disk, and means for coupling the power-shaft and the driving-shaft together.

16. In an apparatus of the kind described the combination of, a power-shaft, a disk receiving power from said power-shaft, a driving-shaft, two rolls mounted in frictional contact with the face of said disk on the driving-shaft, means for changing the rotative distance of one of said rolls from the axis of said disk, means for transmitting the power from said rolls to said driving-shaft, means for disconnecting the power-shaft from said disk, and means for coupling the power-shaft and driving-shaft together.

17. In an apparatus of the kind described the combination of, a power-shaft, a disk receiving power from said power-shaft, a driving-shaft, two rolls mounted on the driving-shaft in frictional contact with the face of said disk, means for varying the rotative distance of said rolls from the axis of said disk, means for transmitting the power through said rolls to the driving-shaft at a speed equal to the difference in rotation of said rolls, and means for coupling the power-shaft and the driving-shaft together.

18. In an apparatus of the kind described the combination of, a power-shaft, a disk receiving power from said power-shaft, a driving-shaft, two rolls mounted on the driving-shaft in frictional contact with the face of said disk, means for varying the rotative distance of said rolls from the axis of said disk, means for transmitting the power through said rolls to the driving-shaft at a speed equal to the difference in rotation of said rolls, means for disconnecting the power-shaft from the disk, and means for coupling the power-shaft and the driving-shaft together.

In testimony whereof I have affixed my signature in presence of two witnesses.

WALTER E. TRUFANT.

Witnesses:
 GEO. D. SOULE,
 G. HOWARD SOULE.